United States Patent [19]
Tachibana et al.

[11] Patent Number: 5,529,864
[45] Date of Patent: Jun. 25, 1996

[54] OPTICAL RECORDING MEDIUM HAVING MASK LAYER

[75] Inventors: Shinichi Tachibana, Yamato; Yoichi Osato, Yokohama, both of Japan

[73] Assignee: Canon Kabushiki Kaisha, Tokyo, Japan

[21] Appl. No.: 355,521

[22] Filed: Dec. 14, 1994

[30] Foreign Application Priority Data

Dec. 16, 1993 [JP] Japan ................................. 5-316579
Aug. 31, 1994 [JP] Japan ................................. 6-206528

[51] Int. Cl.⁶ .................................................. G11B 7/24
[52] U.S. Cl. ...................... 430/20; 430/270.11; 430/945; 430/962
[58] Field of Search ................... 430/19, 20, 271, 430/270, 495, 945, 962, 270.11; 369/288, 284

[56] References Cited

U.S. PATENT DOCUMENTS

| | | | |
|---|---|---|---|
| 5,061,582 | 10/1991 | Brettle et al. | 430/19 |
| 5,153,873 | 10/1992 | Spruit et al. | 369/275.2 |
| 5,164,287 | 11/1992 | Nagae et al. | 430/345 |
| 5,246,758 | 9/1993 | Matsui et al. | 428/64 |

*Primary Examiner*—Charles L. Bowers, Jr.
*Assistant Examiner*—John A. McPherson
*Attorney, Agent, or Firm*—Fitzpatrick, Cella, Harper & Scinto

[57] ABSTRACT

An optical recording medium includes a transparent substrate, a recording layer formed on the transparent substrate, and a mask layer provided between the substrate and the recording layer. A material for the mask layer made of a nonlinear optical material is a photochromic compound, for example, spiropyran, spirooxazine, azobenzene, fulgide, diarylethene, triarylmethane, indigo, etc.

5 Claims, 2 Drawing Sheets

OPTICAL RECORDING MEDIUM HAVING MASK LAYER

BACKGROUND OF THE INVENTION

1. Field of the Invention

The present invention relates to an optical recording medium such as an optical disk, etc., and more particularly to an optical recording medium suitable for high-efficiency recording and reproduction of information at a recording density below the optical resolution.

2. Related Background Art

For example, U.S. Pat. No. 5,153,873 discloses a typical example of the conventional technology for recording and/or reproducing information at a recording density below the optical resolution in an optical disk apparatus etc. In this technology, the recording and/or reproducing of information at a recording density below the optical resolution is realized by using a medium in a laminate structure in which a layer made of a nonlinear optical material is laid on a recording surface, and, further by, while irradiating said medium with a reproduction light spot, greatly changing an optical property, such as a transmittance or reflectivity, etc., of said layer only in a small region within the reproduction light spot, so as to reduce an effective spot diameter effective for reproduction. Also, the U.S. Pat. No. 5,153,873, for example column 6, lines 39–47, lists inorganic materials such as gallium arsenide, indium arsenide, and indium antimony as specific examples of the nonlinear optical material.

There are, however, the following problems in forming a film where such inorganics are used as the nonlinear optical material.

The method of vacuum deposition such as vapor deposition or sputtering is used for forming the inorganic film, but this method is poor in productivity and it is hard to obtain a thick film. This excludes materials which cannot show a sufficient change in the optical property without giving a considerable film thickness, which narrows the range of selection of materials.

SUMMARY OF THE INVENTION

An object of the present invention is to provide an optical recording medium having a layer of a nonlinear optical material formed by a coating method, which is capable of showing a satisfactory change in the optical property, and good productivity.

The above object can be achieved by an optical recording medium comprising a transparent substrate, a recording layer provided above said transparent substrate, and a mask layer containing a photochromic compound, provided between said substrate and said recording layer.

The details will be described with embodiments described below.

DETAILED DESCRIPTION OF THE PREFERRED EMBODIMENTS

[First Embodiment]

Specific examples of the optical recording medium according to the present invention will be described referring to the accompanying drawings.

Figure 1:
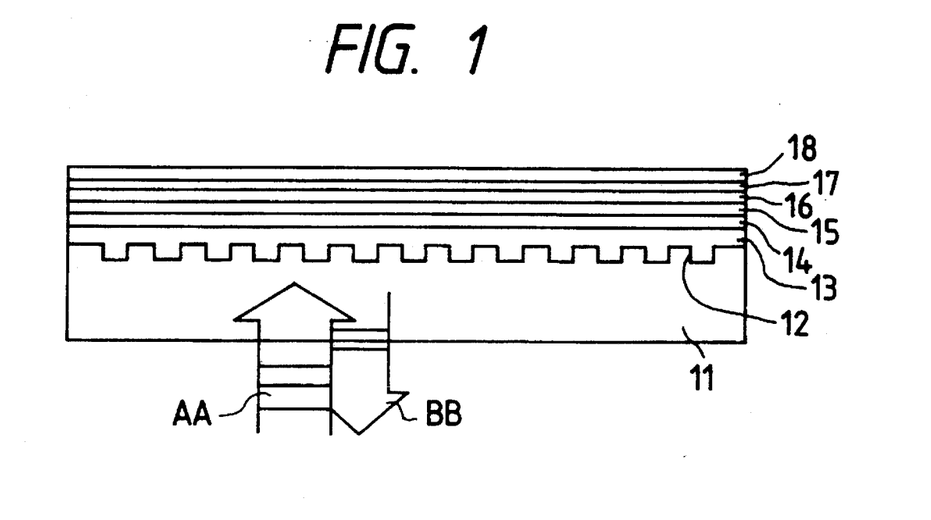
FIG. 1 is a cross-sectional view to show an optical recording medium of the present invention.

FIG. 1 shows an example of the optical recording medium in which the present invention is applied to a CD-ROM, a partial-ROM (P-ROM), or the like. In FIG. 1, projections and depressions 12 corresponding to guide grooves are formed in the main surface of substrate 11. On the main surface of substrate 11 there are a mask layer 13, a $Si_3N_4$ layer 14 as an enhancement layer, a magnetooptical recording layer 15, a $Si_3N_4$ layer 16 as a heat-insulating film, an Al layer 17 as a reflective film, and a protective layer 18 of an ultraviolet-curing resin as a protective layer, built up in the named order. Among the layers, the enhancement layer 14 is provided for enhancing signal outputs by the interference effect, and the heat-insulating layer 16 for decreasing thermal conduction to improve sensitivity thereby.

A material for the substrate 11 is selected from amorphous polymers such as PC, PMMA, polyolefins, etc.

A material for the mask layer made of the nonlinear optical material is a photochromic compound, such as for example, spiropyran, spirooxazine, azobenzene, fulgide, diarylethene, triarylmethane, indigo, etc.

Particularly, diarylethene compounds, which are photon-mode chromic compounds, are preferably used. The compounds have a maximum of absorption of light near the wavelength 600 nm and readily change into a colorless body with irradiation of light of 600 nm so as to greatly increase the light transmittance. They also have such a property of change in transmittance that, when the light is interrupted, it immediately returns to the original state.

Another preferable material for the mask layer is a mixture in which the above-described photochromic compound is dispersed in a polymer liquid crystal which is a copolymer between methyl methacrylate, methyl acrylate and cyclohexyl acrylate, cyclohexyl methacrylate having a pendant of mesogen molecule with liquid crystallinity as a liquid crystal component, in a side chain through a selected alkyl spacer. This mixture is preferable because a response speed of change of absorbance with absorption of light is very fast, about 3 nsec.

Also used are compounds in which the above-described photochromic compound is coupled with a polymer liquid crystal through a covalent bond. Such compounds may be copolymers between a liquid crystal monomer and a photochromic monomer having the property of addition polymerization, and copolymers obtained by an addition reaction of a liquid crystal compound having an unsaturated double bond and a photochromic compound having a double bond with a reactive polymer.

The polymer liquid crystal employed herein may be one selected from a group having positive dielectric constant anisotropy, for example cyanobiphenyl, cyanophenyl benzoate; or one selected from a group having negative dielectric constant anisotropy, for example those having methoxybiphenyl, methoxyphenyl benzoate, or methoxyphenyl (4-phenyl benzoate) structure with the main chain structure being one of polyacrylates, polymethacrylates, polyethers, polyesters, and polysiloxanes, etc.

Since the mask layer in the optical recording medium of the present invention is an organic material, it can be formed by a coating method such as the spin coating method or the bar coating method, etc. Thus, the productivity is high. Also, because the mask layer can be formed in a large thickness by this coating method, the range of selection of material is wide. The thickness of the mask layer is preferably in the range of 0.2 μm to 20 μm, and more preferably in the range of 0.5 μm to 10 μm.

The operation of the present invention as described is next described referring to FIG. 1. A light beam for irradiating the recording layer 15 to read information is incident into the optical disk from the side of substrate 11, as shown by the arrow AA. Incidentally, in the present invention, the disk is so arranged that the mask layer 13, made of a material which changes the transmittance of light with irradiation of light, is formed on the substrate 11. Accordingly, when the light beam goes into the mask layer 13, the mask layer 13 reduces the effective spot diameter contributing to reproduction (a reduction rate of the effective spot can be adjusted by selection of the material forming the mask layer or by the density of the photochromic compound in the polymer liquid crystal) (FIG. 3, wherein 100 represents the light spot, the arrow represents the light spot travelling direction, 11 represents the substrate, 13 represents the mask layer, 15 represents the recording layer, 101 represents regions with low transmittance, 102 represents a recording bit, 103 represents that only that recording bit is reproduced, and 104 represents a region where transmittance becomes high due to temperature rise).

Figure 3:
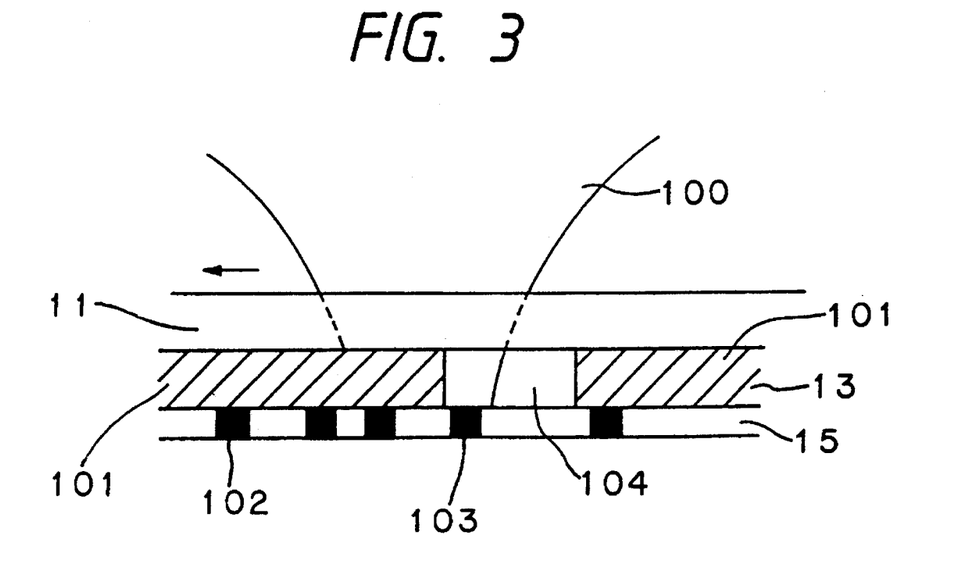
FIG. 3 is a drawing to illustrate the principle of reproduction with the optical recording medium of the present invention.

The light beam reduced in the effective spot diameter then enters the recording layer 15 and thereafter is reflected by the reflective layer 17. Further, the reflected beam passes through the substrate 11 as shown by the arrow BB to be outgoing from the optical disk. This reflected light beam is put into photoelectric detection means (not shown) to be converted into an electric signal, and thereafter a reproduction signal of information is produced therefrom by a well-known method.

As described above, according to the present invention, the coating method is employed to form the layer made of the nonlinear optical material, that is, the mask layer 13, which is excellent in productivity. In addition, because a thick film of the mask layer 13 can be formed, a good change in transmittance can be attained even using a material having a low efficiency in change of transmittance.

EXAMPLES

The first embodiment of the present invention will be described in more detail using the following examples.

(Example 1)

FIG. 1 shows a cross section of a recording medium in the present first example.

Projections and depressions 12 corresponding to the guide grooves are formed in the main surface of a polycarbonate disk substrate 11. On the main surface of the substrate 11 there are a mask layer 13, an enhancement layer 14 ($Si_3N_4$ layer of 70 nm), a recording layer 15 ($Tb_{20}Fe_{73}Co_7$ layer of 20 nm), a heat-insulating layer 16 ($Si_3N_4$ layer of 20 nm), a reflective layer 17 (Al layer of 50 nm), and a protective layer 18 ($Si_3N_4$ layer of 50 nm), built up in the named order. Among these layers, the enhancement layer 14 is provided for enhancing signal outputs by the interference effect, and the heat-insulating layer 16 for decreasing the thermal conductivity to increase the sensitive.

The material for the mask layer 13 was prepared by mixing 5% by weight of furylfulgide as the photochromic compound with a polymer (molecular weight 50,000) of the monomer represented by the following formula.

This material was laid on the substrate by the spin coating method to form the mask layer 13 in the thickness of 0.2 μm after dried (which will be called Sample 1).

(Example 2)

Figure 2:
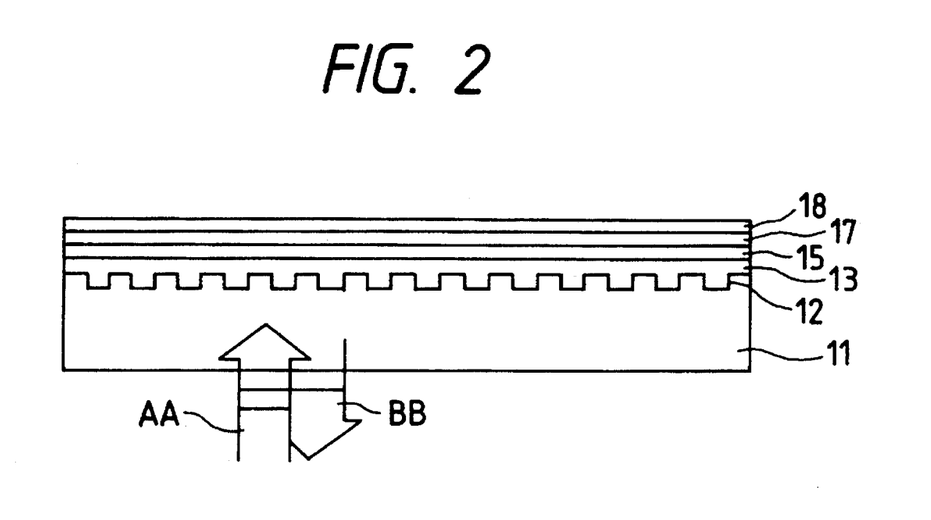
FIG. 2 is a cross-sectional view to show another embodiment of the optical recording medium of the present invention.

FIG. 2 shows a cross section of a recording medium in the present second example.

Projections and depressions 12 corresponding to the guide grooves are formed in the main surface of substrate 11. A recording layer 15 is formed above the main surface, and a reflective layer 17 and a protective layer 18 are successively formed on the recording layer 15. The recording layer 15 is made, for example, of an amorphous metal magnetic material with which information can be reproduced by the magnetooptical effect. In addition to the amorphous metal magnetic material, the material for forming the recording layer 15 may be any material employed for the recording medium in conventional optical disks.

Here, the material for the mask layer 13 was a compound obtained by copolymerization with an initiator of AIBN (azobisisobutyronitrile) in a solvent of THF between the photochromic compound expressed by the following formula and the monomer used in Example 1.

The compound was laid on the substrate by the spin coating method to form the mask layer 13 in the thickness of 0.4 μm (which will be called Sample 2).

(Example 3)

An optical recording medium was produced in the same manner as in Example 1 except that, instead of the material in Example 1, the material for the mask layer 13 was a copolymer between the photochromic compound expressed by the following formula and the monomer used in Example 1.

The thickness of the mask layer 13 was 0.5 μm (which will be called Sample 3).

(Example 4)

An optical recording medium was produced in the same manner as in Example 1 except that, instead of the material in Example 1, the material for the mask layer 13 was a copolymer between the photochromic compound expressed by the following formula and the monomer used in Example 1.

The thickness of the mask layer 13 was 0.2 μm (which will be called Sample 4).

(Example 5)

An optical recording medium was produced in the same manner as in Example 1 except that, instead of the material in Example 1, the material for the mask layer 13 was prepared by formulating 4% by weight of the photochromic compound expressed by the following formula in the polymer of the monomer used in Example 1 (which will be called Sample 5).

Here, the thickness of the mask layer 13 was 0.3 μm.

(Example 6)

An optical recording medium was produced in the same manner as in Example 1 except that, instead of the material in Example 1, the material for the mask layer 13 was prepared by formulating 5% by weight of fulgide as the photochromic compound in the polymer of the monomer used in Example 1 (which will be called Sample 6).

The thickness of the mask layer 13 was 0.2 μm.

The following table shows light absorption characteristics of the compounds used as the material for the mask layer in the above Examples 1 to 6.

TABLE 1

|  | Incident light | Max transmittance change | Response speed |
| --- | --- | --- | --- |
| Example 1 | 780 nm | 10% | 5 nsec |
| Example 2 | 780 nm | 8% | 4 nsec |
| Example 3 | 780 nm | 9% | 5 nsec |
| Example 4 | 780 nm | 10% | 3 nsec |
| Example 5 | 780 nm | 9% | 3 nsec |
| Example 6 | 780 nm | 10% | 4 nsec |

(Comparative Example)

Sample 7 was prepared as a sample of a comparative example in the same manner as Example 1 except that the mask layer 13 was omitted from the structure of Example 1.

The sample disks were evaluated by conducting experiments of recording and/or reproduction using a recording/reproducing evaluation apparatus (Nakamichi OMS-2000).

Rotating each sample disk at a rotating speed of 2600 rpm, RF signals of 12.5 MHz were written at positions of radius 37 mm so that the length of recording marks became 0.4 μm.

The linear velocity of disk at this time was 10 m/s. The recording power at this time was 7 mW, the recording bias magnetic field was 200 Oe, the numerical aperture NA of the objective lens in the optical head was 0.55, and the laser wavelength was 780 nm.

Next, changing the laser power in reproduction, a condition to give a maximum reproduction C/N ratio (dB) was obtained. The results are shown in Table 2.

TABLE 2

| | Reproduction laser power (mW) | | | | | | | |
| --- | --- | --- | --- | --- | --- | --- | --- | --- |
| | 0.5 | 0.75 | 1.0 | 1.25 | 1.5 | 1.75 | 2.0 | 2.25 |
| Sample-1 | *25 | 25 | 28 | 32 | 40 | 42 | 39 | 35 |
| Sample-2 | 25 | 25 | 27 | 35 | 42 | 42 | 38 | 32 |
| Sample-3 | 25 | 25 | 29 | 33 | 39 | 41 | 39 | 29 |
| Sample-4 | 25 | 25 | 27 | 30 | 36 | 40 | 42 | 33 |
| Sample-5 | 24 | 25 | 30 | 33 | 35 | 40 | 41 | 30 |
| Sample-6 | 25 | 27 | 29 | 37 | 39 | 39 | 38 | 31 |
| Sample-7 (Comparative example) | 25 | 30 | 35 | 35 | 32 | 30 | 25 | 22 |

*Numerical values indicate reproduction C/N ratios (db)

From the results in Table 2, the disk of the comparative example gives the maximum reproduction C/N ratio at the reproduction laser power in the range of 1.0 to 1.25 mW. This is because the noise of elements receiving the reproduction light beam is not ignorable below 0.75 mW, and because the temperature of the recording layer increases during reproduction above 1.25 mW to degrade the magnetooptical effect.

In contrast, Examples 1 to 6 showed maximum reproduction C/N ratios 40 to 42 dB nearly in the range of 1.5 to 1.75 mW. These values are about 5 to 7 dB greater than that of the comparative example without a mask layer.

It is considered that this is because the central portion of the reproduction beam is a little higher in temperature than the periphery to increase the transmittance of the mask layer in the central portion, thus presenting the super-resolution effect and because the temperature difference between the central portion and the peripheral portion causes some effect of reflection or refraction of light in the border area where the refractive index changes, resulting in increasing a squeezing effect of the reproduction beam.

It is also considered that the reason why the reproduction power giving the maximum reproduction C/N ratio is about 0.5 mW greater is that the mask layer absorbs or reflects about 5 to 10% of the reproduction light.

[Second Embodiment]

The present embodiment is different from the above-described embodiment in that the photochromic compound is an asymmetric diarylethene compound. This material can further improve reproduction durability. The asymmetric diarylethene compound is one obtained by introducing asymmetric molecules into substituents of a diarylethene compound, thus providing the asymmetry.

Those having different aryl groups at the 1-position and 2-position are preferably used as the one obtained by introducing the asymmetric molecules into the diarylethene compound.

For example, an asymmetric diarylmaleimide derivative having two thiophene groups in one aryl group is first synthesized, and this is copolymerized with styrene, methyl methacrylate, or cyclododecyl methacrylate, etc. to synthesize a copolymer. This copolymer may be used herein. Here, the thiophene groups bonded to the one aryl group may be 2-cyanothiophene group, 2-methoxybenzo thiophene group, etc.

These asymmetric diarylethene compounds have exchange rates into closed ring structure, of nearly 50% at 150° C. Namely, the photochromic reaction (which is a photochromic reaction from a colored isomer to a colorless isomer) has a thermal threshold value. Further materials which can be used herein are mixtures in which the asymmetric diarylethene compound is dispersed in the previously described polymer liquid crystal, and compounds in which the asymmetric diarylethene compound is bonded to the polymer liquid crystal through the covalent bond.

As the diarylethene compound, another material which can be used herein may be one of diaryl fluorocyclopentene compounds listed as those excellent in thermal stability of the colored isomer and in durability of repetition of coloration and discoloration. The following compound may be used as a diaryl fluorocyclopentene compound.

Namely, usable compounds may be copolymers between a liquid crystal monomer having the property of addition polymerization and the diarylethene compound. The polymer liquid crystal used herein is a polymer liquid crystal having a mesogen molecule as a pendant with liquid crystallinity, as a liquid crystal component, through a selected alkyl group spacer in a side chain in a copolymer between methyl methacrylate, methyl acrylate and cyclohexyl acrylate, cyclohexyl methacrylate. The polymer liquid crystal employed herein may be one selected from a group having positive dielectric constant anisotropy, for example cyanobiphenyl, cyanophenyl benzoate; or one selected from a group having negative dielectric constant anisotropy, for example those having methoxybiphenyl, methoxyphenyl benzoate, or methoxyphenyl (4-phenyl benzoate) structure with the main chain structure being one of polyacrylates, polymethacrylates, polyethers, polyesters, and polysiloxanes, etc.

Since the mask layer in the optical recording medium in the second embodiment of the present invention is also an organic material, it can be formed by the coating method such as the spin coating method or the bar coating method, etc. The thickness of the mask layer can be made greater, but it is preferably in the range of 0.2 μm to 20 μm, and more preferably in the range of 0.5 μm to 10 μm.

The operation is the same as with the optical recording medium in the first embodiment as described previously.

EXAMPLES

The second embodiment of the present invention will be described in more detail using the following examples.

(Example 7)

Instead of the material in Example 1, the material employed herein for the mask layer 13 was a copolymer prepared by copolymerizing cyclodecyl methacrylate with an asymmetric diarylmaleimide compound having a 2-cyanothiophene group and a 2-methoxybenzo thiophene group in one of aryl groups having a 5-methoxy indole group and a 2-cyanothiophene group, as the photochromic compound. A mixture was prepared by dispersing 4% by weight of this copolymer in the polymer (polymer liquid crystal: molecular weight 60,000) of the monomer expressed by the following formula.

This mixture was laid on the substrate by the spin coating method to form the mask layer 13 in the thickness of 0.3 μm after dried. This is called Sample 8.

(Example 8)

The material for the mask layer 13 was a compound obtained by copolymerization with an initiator of AIBN (azobisisobutyronitrile) in a solvent of THF between the asymmetric diarylmaleimide and the monomer used in Example 7. The compound was laid on the substrate by the spin coating method to form the mask layer 13 in the thickness of 0.4 μm. This is called Sample 9.

(Example 9)

An optical recording medium was produced in the same manner as in Example 7 except that, instead of using the polymer of the monomer used in Example 7 as the polymer liquid crystal, the polymer liquid crystal was one having a side chain of cyanophenyl benzoate and a main chain of polyacrylate. The thickness of the mask layer was 0.5 μm. This is called Sample 10.

(Example 10)

An optical recording medium was produced in the same manner as in Example 7 except that, instead of using the polymer of the monomer used in Example 7 as the polymer liquid crystal, the polymer liquid crystal was one having a side chain of methoxyphenyl benzoate and a main chain of polymethacrylate. The thickness of the mask layer was 0.4 μm. This is called Sample 11.

(Example 11)

An optical recording medium was produced in the same manner as in Example 8 except that the monomer used in Example 8 was replaced by a monomer in which methacrylate is bonded to methoxyphenyl (4-phenyl benzoate) through the covalent bond. The thickness of the mask layer was 0.5 μm. This is called Sample 12.

(Example 12)

An optical recording medius was produced in the same manner as in Example 7 except that the polymer liquid crystal of the polymer of the monomer used in Example 7 was replaced by a polymer liquid crystal having a side chain of cyanobiphenyl and a main chain of polymethacrylate. The thickness of the mask layer was 0.4 μm. This is called Sample 13.

(Example 13)

The mask layer was formed in the same manner as in Example 7 except that the material for the mask layer 13 was a photochromic compound of a diarylfluorocyclopentene compound and that the compound was dispersed in the polymer liquid crystal in Example 7, and this is called Sample 14. Here, the following compound was employed as the diarylfluorocyclopentene compound.

Table 3 shows optical responses of the materials used in forming the mask layer in the above Examples 7 to 13.

TABLE 3

| | Incident light (nm) | Max transmittance change | Response time (nsec) |
|---|---|---|---|
| Example 7 | 780 | 10 | 50 |
| Example 8 | 780 | 15 | 30 |
| Example 9 | 780 | 12 | 40 |
| Example 10 | 780 | 11 | 35 |
| Example 11 | 780 | 10 | 30 |
| Example 12 | 780 | 12 | 45 |
| Example 13 | 780 | 15 | 35 |

Here, the response time in Table 3 means a time period during which the maximum transmittance change continues.

Comparative Example 2

An optical recording medium was produced in the same manner as in Example 7 except that the mask layer 13 was omitted. This is called Sample 15.

The sample media were evaluated by conducting experiments of recording and/or reproduction using a recording/reproducing evaluation apparatus (Nakamichi OMS-2000). Rotating each sample medium at a rotating speed of 2400 rpm, RF signals of 12.5 MHz were written at positions of radius 36 mm so that the length of recording marks became 0.4 μm. The linear velocity of medium at this time was 10 m/s. The recording power at this time was 7 mW, the recording bias magnetic field was 200 Oe, the numerical aperture NA of the objective lens in the optical head was 0.55, and the laser wavelength was 780 nm.

Next, changing the laser power in reproduction, a condition to give a maximum reproduction C/N ratio (dB) was obtained. The results are shown in Table 4.

TABLE 4

| Reproduction Laser Power (mW) | 0.5 | 0.75 | 1 | 1.25 | 1.5 | 1.75 | 2 | 2.25 |
|---|---|---|---|---|---|---|---|---|
| Sample 8 | *26 | 26 | 29 | 33 | 42 | 44 | 40 | 36 |
| Sample 9 | 25 | 25 | 28 | 35 | 40 | 42 | 40 | 34 |
| Sample 10 | 25 | 25 | 29 | 35 | 40 | 43 | 42 | 35 |
| Sample 11 | 26 | 27 | 28 | 34 | 39 | 41 | 41 | 32 |
| Sample 12 | 25 | 26 | 29 | 36 | 41 | 42 | 42 | 31 |
| Sample 13 | 25 | 26 | 28 | 35 | 40 | 43 | 40 | 32 |
| Sample 14 | 25 | 25 | 29 | 34 | 42 | 43 | 41 | 36 |
| Sample 15 | 24 | 30 | 33 | 35 | 30 | 29 | 24 | 21 |

*Numerical values indicate reproduction C/N ratios (dB)

From the results in Table 4, the medium of the Comparative Example 2 (Sample 15) gives the maximum reproduction C/N ratio at the reproduction laser power in the range of 1.0 to 1.25 mW. This is because the noise of elements receiving the reproduction light beam is not ignorable below 0.75 mW, and because the temperature of the recording layer increases during reproduction above 1.25 mW to degrade the magnetooptical effect.

In contrast, Samples 8 to 14 of the above examples showed maximum reproduction C/N ratios 40 to 43 dB nearly in the range of 1.5 to 1.75 mW. These values are about 5 to 8 dB greater than that of the comparative example without a mask layer.

It is considered that this is because the central portion of the reproduction beam is a little higher in temperature than the periphery to increase the transmittance of the mask layer in the central portion, thus presenting the super-resolution effect and because the temperature difference between the central portion and the peripheral portion causes some effect of reflection or refraction of light in the border area where the refractive index changes, resulting in increasing a squeezing effect of the reproduction beam.

It is also considered that the reason why the reproduction power giving the maximum reproduction C/N ratio is about 0.5 mW greater is that the mask layer absorbs or reflects about 5 to 10% of the reproduction light.

Next, Table 5 shows results of tests of reproduction durability for Samples 8 to 14 (of the examples). The recording conditions were such that while each sample medium was rotated at a rotating speed of 2400 rpm, RF signals of 12.5 MHz were written at positions of radius 36 mm with the length of recording marks being 0.4 μm. The linear velocity of medium at this time was 10 m/s, the recording laser power at this time was 7 mW, the recording bias magnetic field was 200 Oe, the numerical aperture NA of the objective lens in the optical head was 0.55, and the laser wavelength was 780 nm. Then keeping the reproduction laser power at 2 mW, a change in reproduction C/N ratio (dB) was measured with an increase of reproduction cycles.

The experiments of recording and reproduction were conducted using the recording/reproducing evaluation apparatus (Nakamichi OMS-2000).

TABLE 5

| Number of Reproduction cycles | 0 (initial) | 200 | 500 | 1000 | 2000 | 5000 |
|---|---|---|---|---|---|---|
| Sample 8 | *40 | 41 | 41 | 40 | 41 | 40 |
| Sample 9 | 41 | 42 | 42 | 41 | 42 | 41 |
| Sample 10 | 42 | 42 | 41 | 41 | 41 | 41 |
| Sample 11 | 40 | 41 | 41 | 40 | 41 | 41 |
| Sample 12 | 41 | 40 | 41 | 40 | 40 | 40 |
| Sample 13 | 40 | 41 | 40 | 41 | 41 | 40 |
| Sample 14 | 42 | 42 | 41 | 41 | 41 | 40 |

*Numerical values indicate reproduction C/N ratios (dB)

As apparent from Table 5, the reproduction C/N ratio (dB) is little changed even after 5000 cycles of reproduction with each of Samples 8 to 14 (of the examples), as compared with the initial value. Thus, it is understood that they are excellent in durability of reproduction.

What is claimed is:

1. An optical recording medium comprising:

a transparent substrate;

a recording layer provided above said substrate; and a mask layer containing a photochromic compound, provided between said substrate and said recording layer, wherein said mask layer is made of a mixture in which the photochromic compound is dispersed in a polymer liquid crystal.

2. An optical recording medium comprising:

a transparent substrate;

a recording layer provided above said substrate; and a mask layer provided between said substrate and said recording layer, said mask layer being made of a mixture in which a diarylethene compound is dispersed in a polymer liquid crystal.

3. An optical recording medium comprising:

a transparent substrate;

a recording layer provided above said substrate; and a mask layer provided between said substrate and said recording layer, said mask layer being made of a compound in which a diarylethene compound is covalently bonded to a polymer liquid crystal.

4. An optical recording medium according to claim 2, wherein said diarylethene compound is an asymmetric diarylethene compound.

5. An optical recording medium according to claim 3, wherein said diarylethene compound is an asymmetric diarylethene compound.

* * * * *

UNITED STATES PATENT AND TRADEMARK OFFICE
CERTIFICATE OF CORRECTION

PATENT NO. : 5,529,864  Page 1 of 2
DATED : June 25, 1996
INVENTOR(S) : SHINICHI TACHIBANA, ET AL.

It is certified that error appears in the above-indentified patent and that said Letters Patent is hereby corrected as shown below:

COLUMN 1

Line 16, "apparatus" should read --apparatus,--.

COLUMN 2

Line 30, "of" (first occurrence) should be deleted.

COLUMN 7

Line 57, "acrylate and" should read --acrylate,--.

Line 58, "late," should read --late and--.

UNITED STATES PATENT AND TRADEMARK OFFICE
CERTIFICATE OF CORRECTION

PATENT NO. : 5,529,864
DATED : June 25, 1996
INVENTOR(S) : SHINICHI TACHIBANA, ET AL.

It is certified that error appears in the above-indentified patent and that said Letters Patent is hereby corrected as shown below:

COLUMN 9

Line 11, "medius" should read --medium--.

Signed and Sealed this

Twenty-ninth Day of October 1996

Attest:

BRUCE LEHMAN

Attesting Officer    Commissioner of Patents and Trademarks